United States Patent Office 3,277,271
Patented Oct. 4, 1966

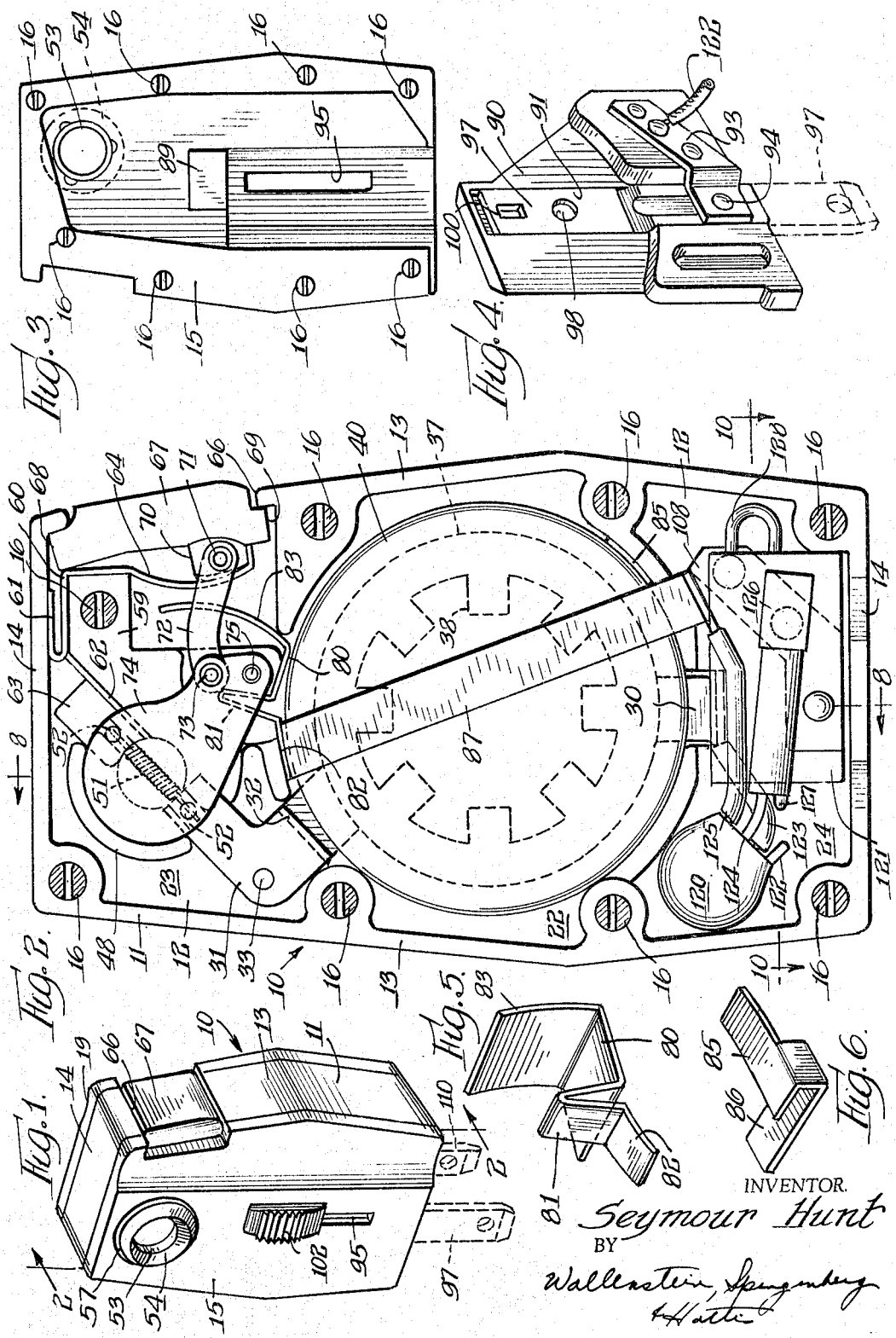

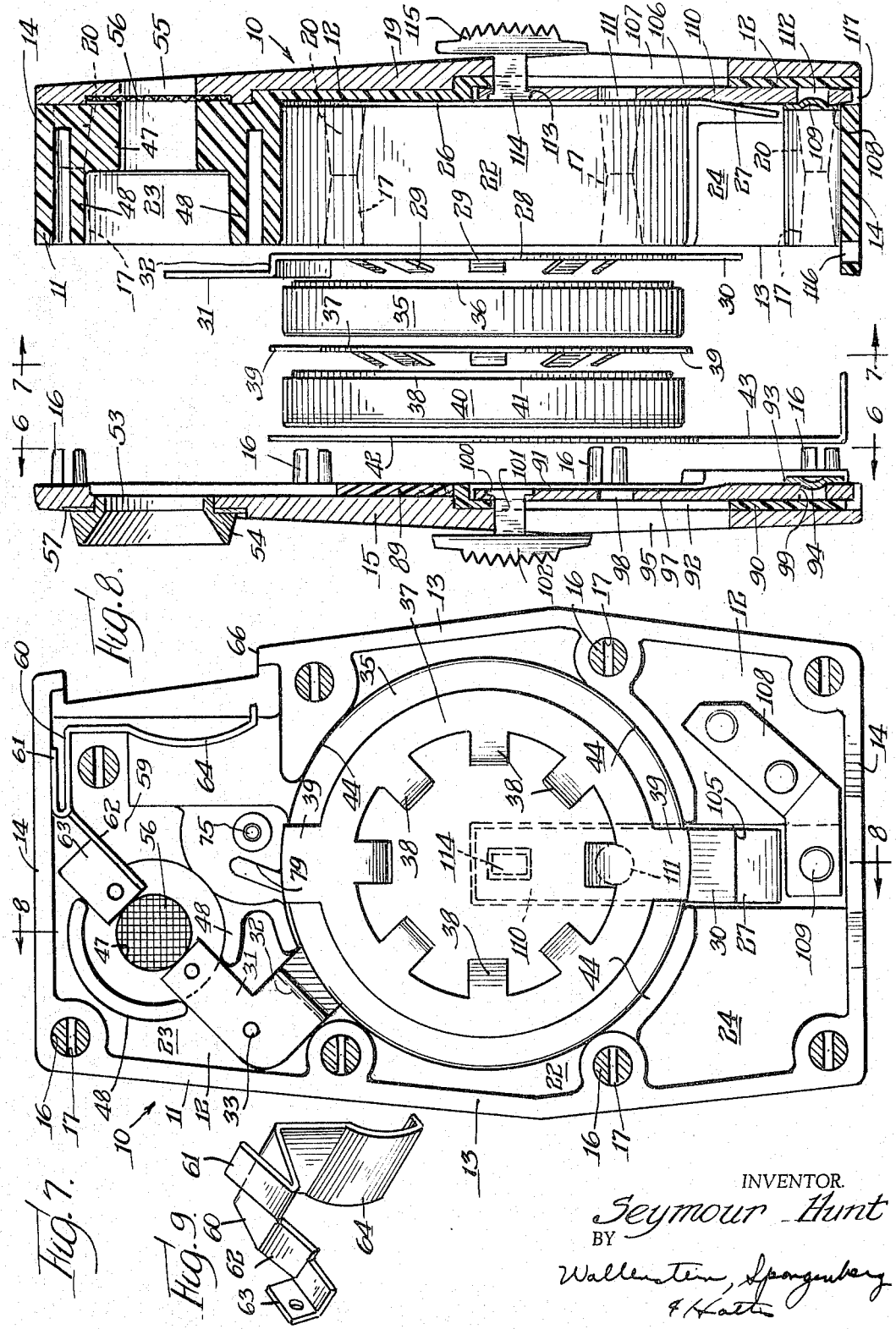

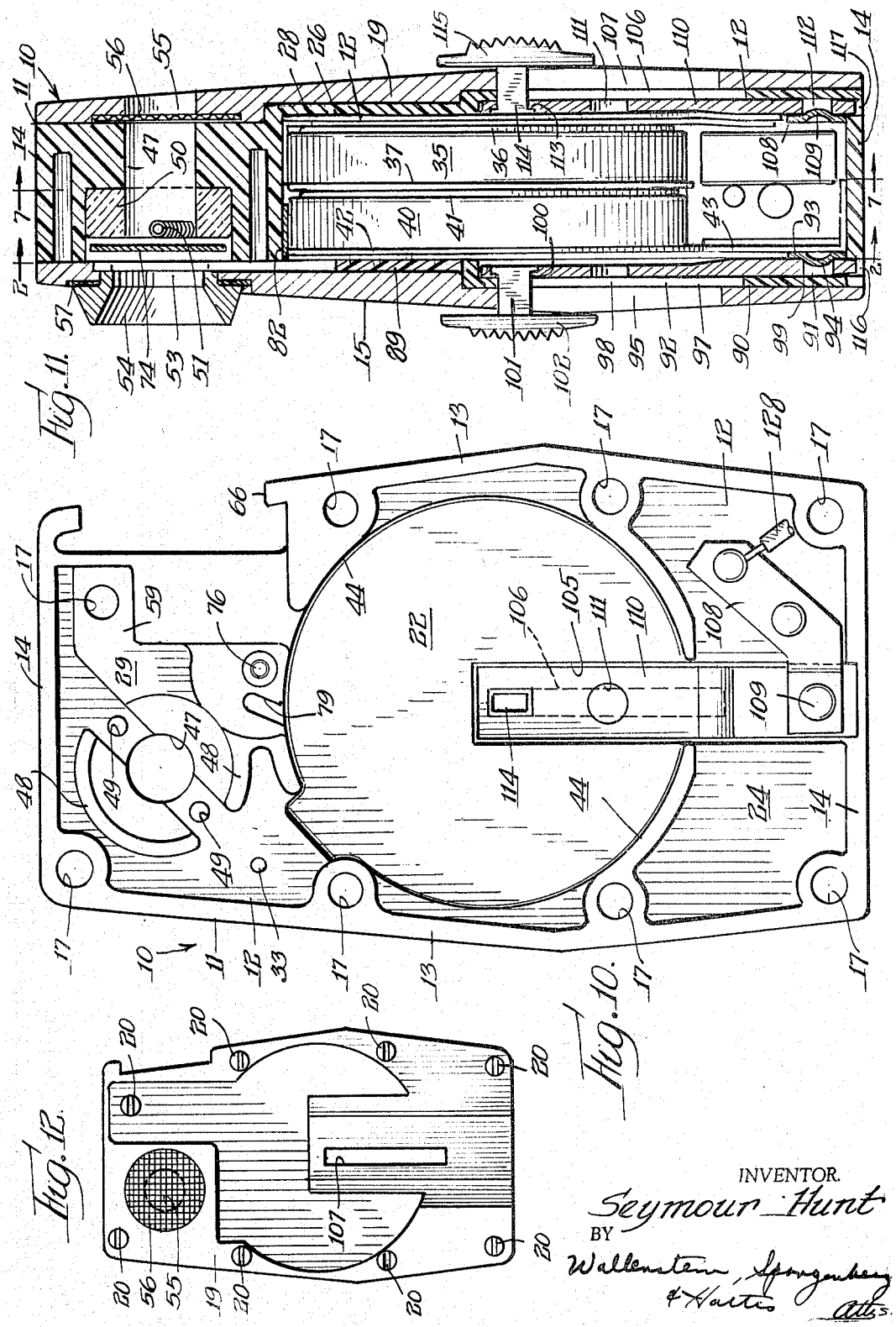

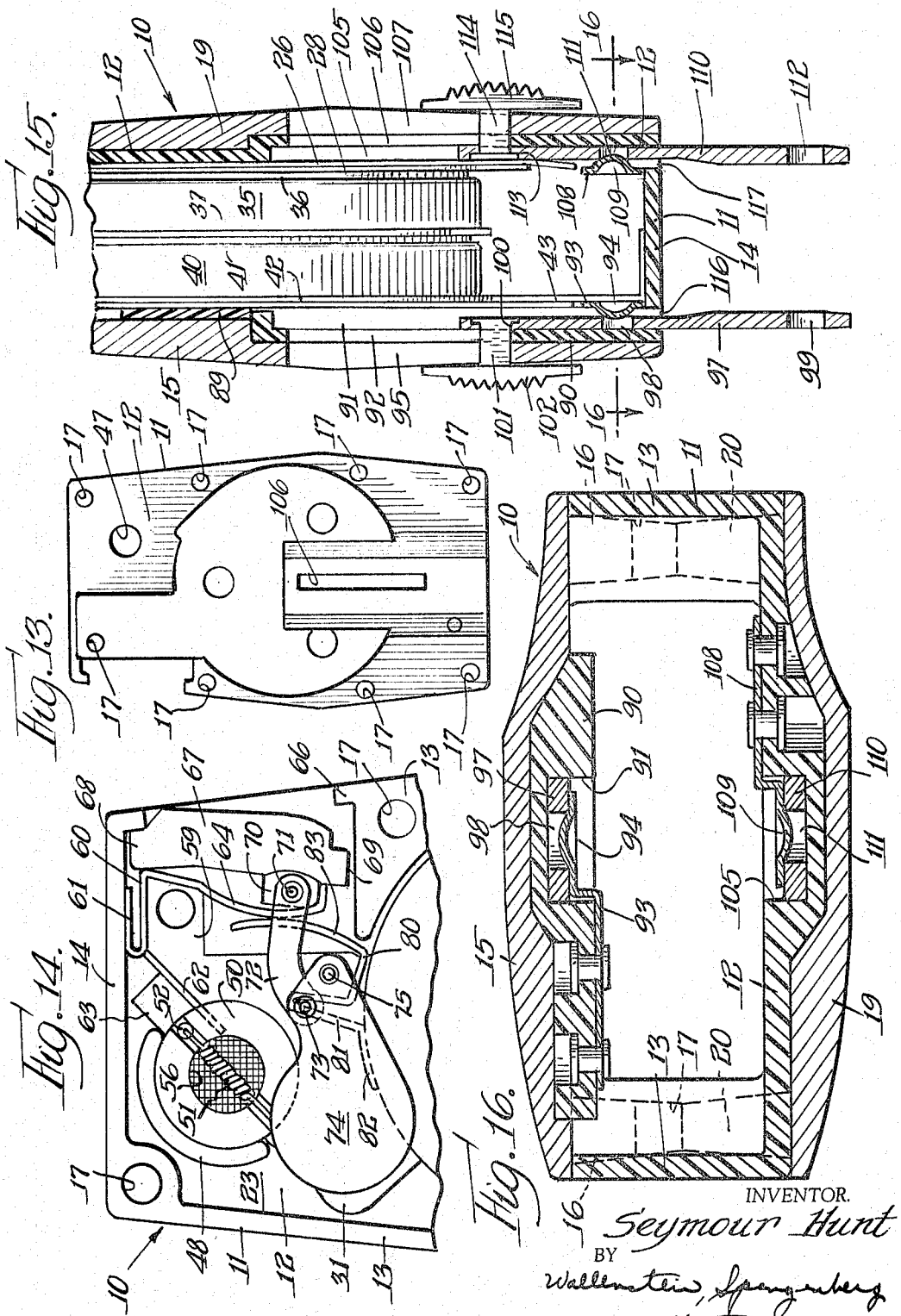

3,277,271
RECHARGEABLE BATTERY OPERATED ELECTRIC CIGARETTE LIGHTER
Seymour Hunt, Chatham, N.J., assignor to Gulton Industries, Inc., Metuchen, N.J., a corporation of New Jersey
Filed Dec. 9, 1963, Ser. No. 328,839
16 Claims. (Cl. 219—268)

The principal object of this invention is to provide a new and improved battery operated cigarette lighter and more particularly such a lighter utilizing rechargeable batteries, wherein the lighter is compact and light in weight so that it may be readily and conveniently carried, wherein the lighter may be readily and easily manipulated for cigarette lighting purposes, wherein lighting of a cigarette is rapidly and efficiently accomplished, and wherein the lighter may be readily and conveniently plugged into an electrical receptacle for recharging the rechargeable batteries thereof.

Briefly, the battery operated cigarette lighter of this invention includes a small and compact housing which has an access opening therein for receiving a cigarette to be lighted, and a heater element in the housing adjacent the access opening being operative upon energization thereof to ignite the cigarette inserted in the access opening. Rechargeable batteries are also carried in the housing and electrical connections including a switch between the heater element and the batteries operates to energize the heater element when the switch is closed. A conveniently manipulatable switch operating member extends through an opening in the housing for closing the switch. Rectifier means are also located in the housing and are electrically connected to the batteries for recharging the batteries when energized, and a pair of prongs are electrically connected to the rectifier means for energizing the rectifier means. The housing is also provided with means for slidably mounting the prongs between hidden retracted positions for carrying purposes and operative extended positions for reception in an electrical receptacle for energizing the rectifier means.

Preferably, a flag is movably mounted in the housing adjacent the cigarette access opening and is connected to the switch operating member to close the access opening when the switch is open and to open the access opening when the switch is closed, thus preventing possible damage to the heater element when the lighter is not in use. Also, preferably, the housing is provided with an air supply opening in alignment with the cigarette access opening to supply combustion supporting air to the cigarette as it is being ignited by the heater element, thereby providing rapid and efficient lighting of the cigarette. This air supply opening is preferably provided with a screen to prevent damage to the heater element. Also, preferably, the means for slidably mounting the prongs includes internal guideways in the housing with slots communicating with the guideways and manipulatable projections on the prongs extending through the slots for retracting and advancing the prongs.

Also, preferably, the housing is made of two main parts, a housing member forming a side wall, end walls and edge walls of the housing and a cover member secured to the housing member forming another side wall of the housing, and the side wall of the housing member may also be provided with a cover so as to provide symmetry in appearance. The housing preferably has three internal communicating compartments, one for receiving the batteries, another for receiving the heater element and switch and the other for receiving the rectifier means. The aligned cigarette access and air supply openings which communicate with the second-mentioned compartment are preferably in opposed side walls of the housing, and the opening through which the switch operating member extends is preferably in an edge wall of the housing for ready and easy manipulation. The openings through which the prongs are retracted and extended are preferably in and end wall of the housing and the slots through which the manipulatable projections of the prongs extend are preferably in the side walls of the housing.

Further objects of this invention reside in the details of construction of the battery operated cigarette lighter and in the cooperative relationships of the component parts thereof.

Other objects and advantages of this invention will become apparent to those skilled in the art upon reference to the accompanying specification, claims and drawings in which:

FIG. 1 is a perspective view of the battery operated cigarette lighter of this invention;

FIG. 2 is an enlarged view through the cigarette lighter with the cover member removed and taken substantially along the lines 2—2 of FIGS. 1 and 11 and illustrating the switch in open position;

FIG. 3 is an elevational view of the inside of the front cover member;

FIG. 4 is a perspective view of a prong holding member which is interposed between the housing member and the front cover member;

FIG. 5 is a perspective view of a portion of the switch;

FIG. 6 is a perspective view of a contact member;

FIG. 7 is a vertical sectional view through the lighter of this invention taken substantially along the lines 7—7 of FIGS. 8 and 11;

FIG. 8 is an exploded sectional view through the lighter taken substantially along the line 8—8 of FIG. 7;

FIG. 9 is a perspective view of another portion of the switch;

FIG. 10 is a view of the inside of the housing member looking from the front;

FIG. 11 is a vertical sectional view through the lighter showing the exploded arrangement of FIG. 8 in assembled position and with the prongs in retracted positions;

FIG. 12 is an elevational view of the inside of the back plate which is secured to the back of the side wall of the housing member;

FIG. 13 is a view of the back of the side wall of the housing member with the back plate removed;

FIG. 14 is a partial view corresponding to the upper portion of FIG. 2 but illustrating the switch in closed position;

FIG. 15 is a vertical sectional view through the lighter and corresponding to the lower portion of FIG. 11, but showing the prongs extended; and FIG. 16 is a horizontal sectional view taken substantially along the line 16—16 of FIG. 15.

The battery operated cigarette lighter of this invention is generally designated at 10. It includes a housing member 11 which is preferably formed of electrical insulating material, as by molding the same from a thermosetting synthetic plastic or the like, such as flame resistant polypropylene. The housing member 11 has a side wall 12, edge walls 13 and end walls 14. The housing member 11 is closed by a cover member 15 which may be made of any suitable material, and for appearance purposes it may be made from diecast aluminum or zinc alloys or the like. The cover member 15 is provided on its inner surface with a plurality of split pins 16 which are adapted to be press fit into holes 17 in the housing member 11 for securing the cover member 15 to the housing member 11. To provide symmetry in appearance a back plate 19, which also may be made of diecast aluminum or zinc alloy or the like, is secured to the back of the side wall 12 of the housing member 11 by means of split pins 20 press fit into the holes 17 in the housing member. Thus, the housing as a whole has end walls 14, edge walls 13 and side walls formed by the cover member 15 and by the side wall 12 of the housing and the rear plate 19.

Referring more particularly to FIG. 10 the interior of the housing preferably has three compartments, a battery receiving compartment 22, a heater element and switch receiving compartment 23 and a rectifier means receiving compartment 24. The battery receiving compartment 22 has a generally circular interior 44 for receiving the circular batteries and associated parts. Referring more particularly to FIG. 8, a generally circular insulator sheet 26 having a downwardly extending tab 27 is first received in the compartment 22, this insulator sheet being made from fishpaper or the like. Overlying the insulator sheet 26 is a washer contact 28 made of Phosphor bronze or the like and having a plurality of inwardly extending fingers 29, a downwardly extending tab 30 and an upwardly extending tab 31 which is offset as indicated at 32. The downwardly extending tab 30 extends through a slot in the wall 44 of the compartment 22 into the compartment 24 and the upwardly extending tab 31 extends into the compartment 23. The upwardly extending tab 21 is provided with a pair of holes, one of which is press fit onto a projection 43 formed in the housing 11 to assist in holding the washer contact 28 firmly in place.

A circular rechargeable battery 35 having its case forming one electrode and having a central electrode 36 overlies the washer contact 28 with the central electrode 36 engaging the fingers 29 to make electrical contact between the contact washer and the central electrode. Overlying the battery 35 is another washer contact 37, made of Phosphor bronze or the like, which engages the electrode case of the battery 35 and which has inwardly extending fingers 38 and outwardly extending projections 39. Overlying the washer contact 37 is another circular rechargeable battery 40 having its case forming one electrode and a central electrode 41 which engages and makes electrical contact with the fingers 38 of the contact washer 37. Thus, the two batteries 35 and 40 are electrically connected in series. The rechargeable batteries 35 and 40 may be the usual nickel-cadmium batteries or the like. Overlying the battery 40 is an insulating sheet 42 having a downwardly extending projection 43, the insulating sheet 42 also being made of fishpaper or the like. These various parts are shown in their assembled relation in FIG. 11.

Referring now more particularly to FIGS. 10 and 7, the side wall 12 of the housing member 11 is provided at the compartment 23 with an air supply opening 47 and concentrically arranged with respect to this opening is a pair of substantially semicircular bosses 48. Arranged within the bosses 48 and on each side of the air supply opening 47 are holes 49, one of the holes 49 being in alignment with one of the holes in the tab 31 of the washer contact 28. As shown more clearly in FIGS. 2, 11 and 14, a heater assembly is arranged within the bosses 48, the heater assembly including an annular member 50 formed of suitable electrical insulating and heat resisting material such as flame resistant polypropylene or the like, a pair of electrically conducting pins 52 extending through the member 50 into the holes 49 and an electrical heater element 51 formed of a platinum-rhodium alloy or the like attached to and extending between the pins 52. One of the pins 52 makes electrical contact with the tab 31 of the washer contact 28 and the other pin 52 makes electrical contact with a tab 63 of a switch member. Thus, the electrical heater element 51 is electrically connected between the tabs 31 and 63.

The heater element 51 is arranged in alignment with the air supply opening 47. The front cover member 15 is provided with an access opening 53 in which is suitably secured a ferrule 54 formed of aluminum or the like, the access opening 53 and ferrule 54 being in alignment with the air supply opening 47 and the heater element 51.

Thus, when a cigarette is inserted through the access opening 53 and ferrule 54, the heater element 51, when energized, operates to ignite the cigarette. A decorative ring 57, formed of anodized aluminum or the like, is preferably secured in place behind the ferrule 54. The rear plate 19 is also provided with an opening 55 which is internally covered by a screen 56 formed of stainless steel or the like, the opening 55 being in alignment with the openings 47 and 53. Thus, when a cigarette is being ignited by the heater element 51, combustion supporting air is efficiently conducted through the openings 55 and 47 to assist materially in lighting the cigarette.

The compartment 23 is also provided with a boss 59 for supporting a switch member 60, the switch member being formed of Phosphor bronze or the like and being illustrated in more detail in FIG. 2, 7, 9 and 14. The switch member 60 has a portion thereof extending over the boss 59 and a resilient tab 61 engaging the end wall 14 of the housing member for holding the switch member 60 in place. The switch member 60 has an extension 62 carrying the tab 63 which is in electrical connection with one end of the heater element 51. The switch member 60 also has a downwardly extending resilient contact portion 64 which is adjacent to an opening 66 in the edge wall 13 of the housing member. A switch operator 67, formed of electrical insulating material such as flame resistant polypropylene or the like, is arranged in the opening 66 and it is provided at its ends with projections 68 and 69 cooperating with the edges of the opening 66. The projection 68 serves as a pivot for the switch operator 67 and the projection 69 serves as a stop therefor, the contact portion 64 engaging the switch operator 67 to normally urge it to its outer position as illustrated in FIG. 2. The switch operator 67 may be depressed against the action of the contact portion 64 to pivotally move the same inwardly, as illustrated in FIG. 14, and the projection 68 operates as the pivot for this inward pivotal movement.

The switch operator 67 is also provided with a boss 70 which carries an eyelet pin 71. One end of a link 72, formed of stainless steel or the like, is pivoted to the eyelet pin 71 and the other end is pivoted to an eyelet pin 73 carried by a flag 74, formed of anodized sheet aluminum or the like, which in turn is pivoted by a pin 75 carried in a hole 76 in the housing member in the compartment 23. When the switch operator 67 is in its extended position, the flag 74 covers the opening 53 in the cover member 15 so as to protect the heater element 51, this position being illustrated in FIG. 2. When the switch operator 67 is depressed, as illustrated in FIG. 14, the flag 74 is moved to a position to expose the heater element 51 through the opening 53 in the cover member 15 for cigarette lighting purposes.

Another boss in the compartment 23 is provided with a notch 79 communicating with the compartment 22, and a cooperating switch member 80, formed of Phosphor bronze or the like, is provided with a bent portion 81 which is received in this notch 79. The bent portion 81 operates to maintain the cooperating switch member 80 in place. The switch member 80, which is shown in detail in FIG. 5, is provided with a tab 82 which is adapted to engage and make electrical contact with the outer wall electrode of the battery 40. The switch member 80 is also provided with a contact portion 83 adjacent to the contact portion 64 of the switch member 60 so that when the switch operator 67 is depressed, as illustrated in FIG. 14, the contact portions 64 and 83 engage to complete an electrical circuit through the heater element 41, the electrical circuit extending from the central electrode 36 of the battery 35 through the washer contact 28 and its tab 31, the heater element 51, the tab 63 and the switch member 60, and the switch member 80 and its tab 82 to the outer wall electrode of the battery 40, the batteries 40 and 35 being connected in series by the washer contact 39. Thus, the heater element 51 is energized when the switch operator 67 is depresed and at the same time the flag 74 is swung away from the opening 53 to expose the energized heater element 51 for cigarette lighting purposes.

A contact clip, formed of Phosphor bronze or the like, such as illustrated in FIGS. 6 and 2, has a portion 85 in the compartment 22 engaging the outer wall electrode of the battery 40 to make electrical contact therewith and a portion 86 extending into the compartment 24 for making electrical connection to the rectifier means therein for the purpose of recharging the rechargeable batteries 35 and 40. In lieu of this contact member 85, 86, a metallic strap 87 (FIG. 2) may be suitably secured as by soldering to the tab 82 of the switch member 80, the strap 87 extending into the compartment 24 for making electrical contact with the rectifier means. Either arrangement may be utilized.

The rectifier means in the compartment 24 is energized through a pair of retractable prongs 97 and 110 formed of brass or the like. Towards this end the lighter includes a prong holding member 90 formed of suitable insulating material, such as flame resistant polypropylene or the like, and which is arranged between the housing member 11 and the cover member 15. The prong holding member 90 is received in a suitable recess in the cover member 15 and is maintained in place by a hold down insulator 89 (FIGS. 3, 4 and 11). The prong holding member 90 is provided with a longitudinally extending guideway 91 and a slot 92. Secured to the member 90, as by rivets or the like, is a contact arm 93, formed of Phosphor bronze or the like and having a detent portion 94 overlying the guideway 91. The cover member 15 is provided with a slot 95 overlying the slot 92 in the member 90. The prong 97 is slidably mounted in the guideway 91 and is in engagement with the detent portion 94 of the contact 93. The prong 97 is provided with a pair of spaced holes 98 and 99, the hole 98 engaging the detent portion 94 when the prong 97 is extended and the hole 99 engaging the detent portion 94 when the prong is retracted, as illustrated in FIGS. 15 and 11. The prong 97 is also provided at its upper end with a hole 100 in which is secured a projection or button 101, formed of electrical insulating material such as polystyrene or the like, which extends through the slots 91 and 95, the outer end of the projection or button 101 being provided with a manipulating ear 102. By manipulating the ear 102 the prong 97 may be slid between its retracted and extended positions as illustrated in FIGS. 11 and 15.

The side wall 12 of the housing member is also provided with a longitudinally extending guideway 105 and a slot 106, and the rear plate 19 is provided with a slot 107 overlying the slot 106. A contact member 108, formed of Phosphor bronze or the like, is suitably secured to the side wall 12 of the housing member 11, as by rivets or the like, and it is provided with a detent portion 109 overlying the guideway 105. The prong 110 is slidably mounted in the guideway 105 and is engaged by the detent portion 109 of the contact 108. The prong 110 is provided with holes 111 and 112 which are adapted to be alternately engaged by the detent portion 109 when the prong 110 is extended and retracted. The prong 110 is also provided with a hole 113 in which is secured a projection or button 114, formed of electrical insulating material such as polystyrene or the like, which extends through the slots 106 and 107, the outer end of the projection or botton 114 being provided with a manipulating ear 115 for advancing and retracting the prong 110. The advanced and retracted positions of the prong 110 are also illustrated in FIGS. 15 and 11. The bottom end wall 14 of the housing member 11 is provided with a pair of openings 116 and 117 through which the prongs 97 and 110 may be extended and retracted. When the prongs 97 and 110 are extended, they may be inserted in an electrical receptacle for the purpose of recharging the rechargeable batteries 35 and 40, and when they are retracted, they are hidden so as not to interfere with the carrying and use of the lighter.

Arranged within the compartment 24 of the housing is a rectifier means including a full wave rectifier 120, such as a bridge arranged selenium rectifier, and a condenser 121. The rectifier 120 has four leads, 122, 123, 124 and 125 extending from the bridge arranged elements thereof. The input lead 122 is soldered to the contact member 93 in engagement with the prong 97 and the input lead 124 is connected through a connector 126 and a lead 127 to the condenser 121 which in turn is connected by a lead 128 to the contact member 108 which in turn contacts the prong 110. Thus, the input of the rectifier 120 and the condenser 121 are connected in series across the prongs 97 and 110 so as to be energized thereby, the condenser operating to protect the rectifier. The output lead 123 is connected to the tab 30 on the washer contact 28 which contacts the central electrode of the battery 35, and the output lead 125 is connected to the contact 85, 86 or the strap 87 which electrically contact the casing electrode of the battery 40. Thus, the rechargeable batteries 35 and 40 are connected in series across the output of the rectifier 120 so that when the prongs 97 and 110 are electrically energized, the batteries 35 and 40 are recharged.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. A rechargeable battery operated cigarette lighter comprising, a housing having an access opening for a cigarette adjacent one end of the housing, rechargeable batteries in the housing, a heater element in the housing adjacent the access opening and operative upon energization thereof to ignite a cigarette received in the access opening, electrical connections including a switch in the housing between the heater element and the batteries for energizing the heater element when the switch is closed, a switch operating member extending through an opening in the housing adjacent said one end of the housing and manipulatable to close the switch, rectifier means in the housing electrically connected to the batteries for recharging the batteries when energized, a pair of prongs electrically connected to the rectifier means for energizing the rectifier means, and means including openings in the other end of the housing for slidably mounting the prongs between hidden retracted positions and operative extended positions for reception in an electrical receptacle for energizing the rectifier means.

2. A rechargeable battery operated cigarette lighter comprising, a housing having an access opening for a cigarette adjacent one end of the housing, rechargeable batteries in the housing, a heater element in the housing adjacent the access opening and operative upon energization thereof to ignite a cigarette received in the access opening, electrical connections including a switch in the housing between the heater element and the batteries for energizing the heater element when the switch is closed, a switch operating member extending through an opening in the housing adjacent said one end of the housing and manipulatable to close the switch, a flag movably mounted in the housing adjacent the access opening and movable between an advanced position for closing the access opening and a retracted position for opening the access opening, means connecting the flag to the switch operating member for retracting the flag when the switch is closed by the switch operating member, rectifier means in the housing electrically connected to the batteries for recharging the batteries when energized, a pair of prongs electrically connected to the rectifier means for energizing the rectifier means, and means including openings in the other end of the housing for slidably mounting the prongs between hidden retracted positions and operative extended positions for reception in an electrical receptacle for energizing the rectifier means.

3. A rechargeable battery operated cigarette lighter comprising, a housing having an access opening for a cigarette in one side thereof and an air supply opening in the opposite side thereof in alignment with the access opening, rechargeable batteries in the housing, a heater element in the housing between the access opening and the air supply opening and operative upon energization thereof to ignite a cigarette received in the access opening with combustion supporting air being supplied through the aligned air supply opening, electrical connections including a switch in the housing between the heater element and the batteries for energizing the heater element when the switch is closed, a switch operating member extending through an opening in the housing and manipulatable to close the switch, rectifier means in the housing electrically connected to the batteries for recharging the batteries when energized, and a pair of prongs electrically connected to the rectifier means for reception in an electrical receptacle for energizing the rectifier means.

4. A rechargeable battery operated cigarette lighter comprising, a housing having an access opening for a cigarette in one side thereof and an air supply opening in the opposite side thereof in alignment with the access opening, rechargeable batteries in the housing, a heater element in the housing between the access opening and the air supply opening and operative upon energization thereof to ignite a cigarette received in the access opening with combustion supporting air being supplied through the aligned air supply opening, electrical connections including a switch in the housing between the heater element and the batteries for energizing the heater element when the switch is closed, a switch operating member extending through an opening in the housing and manipulatable to close the switch, and a screen in the housing overlying the air supply opening, rectifier means in the housing electrically connected to the batteries for recharging the batteries when energized, and a pair of prongs electrically connected to the rectifier means for reception in an electrical receptacle for energizing the rectifier means.

5. A rechargeable battery operated cigarette lighter comprising, a housing having an access opening for a cigarette in one side thereof and an air supply opening in the opposite side thereof in alignment with the access opening, rechargeable batteries in the housing, a heater element in the housing between the access opening and the air supply opening and operative upon energization thereof to ignite a cigarette received in the access opening with combustion supporting air being supplied through the aligned air supply opening, electrical connections including a switch in the housing between the heater element and the batteries for energizing the heater element when the switch is closed, a switch operating member extending through an opening in the housing and manipulatable to close the switch, a flag movably mounted in the housing adjacent the access opening and movable between an advanced position for closing the access opening and a retracted position for opening the access opening, means connecting the flag to the switch operating member for retracting the flag when the switch is closed by the switch operating member, rectifier means in the housing electrically connected to the batteries for recharging the batteries when energized, and a pair of prongs electrically connected to the rectifier means for reception in an electrical receptacle for energizing the rectifier means.

6. A rechargeable battery operated cigarette lighter comprising, a housing having an access opening for a cigarette, rechargeable batteries in the housing, a heater element in the housing adjacent the access opening and operative upon energization thereof to ignite a cigarette received in the access opening, electrical connections including a switch in the housing between the heater element and the batteries for energizing the heater element when the switch is closed, a switch operating member extending through an opening in the housing and manipulatable to close the switch, rectifier means in the housing electrically connected to the batteries for recharging the batteries when energized, a pair of prongs electrically connected to the rectifier means for energizing the rectifier means, said housing having a pair of guideways on opposite sides of the housing longitudinally slidably receiving the prongs, a pair of openings at the ends of the guideways and a pair of slots on opposite sides of the housing along the guideways, and manipulatable projections on the prongs extending through said slots for independently longitudinally sliding the prongs through said last-mentioned openings between hidden retracted positions and operative extended positions for reception in an electrical receptacle for energizing the rectifier means.

7. A rechargeable battery operated cigarette lighter comprising, a housing having an access opening for a cigarette in one side thereof and an air supply opening in the opposite side thereof in alignment with the access opening, rechargeable batteries in the housing, a heater element in the housing between the access opening and the air supply opening and operative upon energization thereof to ignite a cigarette received in the access opening with combustion supporting air being supplied through the aligned air supply opening, electrical connections including a switch in the housing between the heater element and the batteries for energizing the heater element when the switch is closed, and a switch operating member extending through an opening in the housing and manipulatable to close the switch, rectifier means in the housing electrically connected to the batteries for recharging the batteries when energized, a pair of prongs electrically connected to the rectifier means for energizing the rectifier means, and means including openings in the housing for slidably mounting the prongs between hidden retracted positions and operative extended positions for reception in an electrical receptacle for energizing the rectifier means.

8. A rechargeable battery operated cigarette lighter comprising, a housing having an access opening for a cigarette in one side thereof and air supply opening in the opposite side thereof in alignment with the access opening, rechargeable batteries in the housing, a heater element in the housing between the access opening and the air supply opening and operative upon energization thereof to ignite a cigarette received in the access opening with combustion supporting air being supplied through the aligned air supply opening, electrical connections including a switch in the housing between the heater element and the batteries for energizing the heater element when the switch is closed, and a switch operating member extending through an opening in the housing and manipulatable to close the switch, and a screen in the housing overlying the air supply opening, rectifier means in the housing electrically connected to the batteries for recharging the batteries when energized, a pair of prongs electrically connected to the rectifier means for energizing the rectifier means, and means including openings in the housing for slidably mounting the prongs between hidden retracted positions and operative extended positions for reception in an electrical receptacle for energizing the rectifier means.

9. A rechargeable battery operated cigarette lighter comprising, a housing having an access opening for a cigarette in one side thereof and an air supply opening in the opposite side thereof in alignment with the access opening, rechargeable batteries in the housing, a heater element in the housing between the access opening and the air supply opening and operative upon energization thereof to ignite a cigarette received in the access opening with combustion supporting air being supplied through the aligned air supply opening, electrical connections including a switch in the housing between the heater element and the batteries for energizing the heater element when the switch is closed, and a switch operating member extending through an opening in the housing and manipulatable to close the switch, a flag movably mounted in the housing adjacent the access opening and movable between an advanced position for closing the access opening and a retracted position for opening the access opening, means connecting the flag to the switch operating member for retracting the flag when the switch is closed by the switch operating member, rectifier means in the housing electrically connected to the batteries for recharging the batteries when energized, a pair of prongs electrically connected to the rectifier means for energizing the rectifier means, and means including openings in the housing for slidably mounting the prongs between hidden retracted positions and operative extended positions for reception in an electrical receptacle for energizing the rectifier means.

10. A rechargeable battery operated cigarette lighter comprising, a housing having an access opening for a cigarette in one side thereof and an air supply opening in the opposite side thereof in alignment with the access opening, rechargeable batteries in the housing, a heater element in the housing between the access opening and the air supply opening and operative upon energization thereof to ignite a cigarette received in the access opening with combustion supporting air being supplied through the aligned air supply opening, electrical connections including a switch in the housing between the heater element and the batteries for energizing the heater element when the switch is closed, and a switch operating member extending through an opening in the housing and manipulatable to close the switch, a flag movably mounted in the housing adjacent the access opening and movable between an advanced position for closing the access opening and a retracted position for opening the access opening, means connecting the flag to the switch operating member for retracting the flag when the switch is closed by the switch operating member, and a screen in the housing overlying the air supply opening, rectifier means in the housing electrically connected to the batteries for recharging the batteries when energized, a pair of prongs electrically connected to the rectifier means for energizing the rectifier means, and means including openings in the housing for slidably mounting the prongs between hidden retracted positions and operative extended positions for reception in an electrical receptacle for energizing the rectifier means.

11. A rechargeable battery operated cigarette lighter comprising, a housing, a heater element in the housing for igniting a cigarette when energized, rechargeable batteries in the housing, electrical connections including a manipulatable switch in the housing between the heater element and the batteries for energizing the heater element when the switch is closed, rectifier means in the housing electrically connected to the batteries for recharging the batteries when energized, a pair of prongs electrically connected to the rectifier means for energizing the rectifier means, said housing having a pair of guideways on opposite sides of the housing longitudinally slidably receiving the prongs, a pair of openings at the ends of the guideways and a pair of slots on opposite sides of the housing along the guideways, and manipulatable projections on the prongs extending through said slots for independently longitudinally sliding the prongs through said last-mentioned openings between hidden retracted positions and operative extended positions for reception in an electrical receptacle for energizing the rectifier means.

12. A rechargeable battery operated cigarette lighter comprising, a hollow housing including a housing member forming a side wall, end walls and edge walls of the housing and a cover member secured to the housing member and forming another side wall of the housing, said hollow housing having a battery receiving compartment and a heater element and switch receiving compartment, rechargeable batteries in the first-mentioned compartment, one of the side walls of the housing having an access opening for a cigarette communicating with the second-mentioned compartment, the other of the side walls of the housing having an air supply opening in alignment with the access opening and communicating with the second-mentioned compartment, a heater in the second-mentioned compartment between the access opening and the air supply opening and operative upon energization thereof to ignite a cigarette received in the access opening with combustion supporting air being supplied through the aligned air supply opening, a switch in the second-mentioned compartment, electrical connections between the batteries, heater element and switch for energizing the heater element when the switch is closed, one of the edge walls of the housing having an opening communicating with the second-mentioned compartment, a switch operating member extending through said last-mentioned opening and manipulatable to close the switch, rectifier means in the housing electrically connected to the batteries for recharging the batteries when energized, and a pair of prongs electrically connected to the rectifier means for reception in an electrical receptacle for energizing the rectifier means.

13. A rechargeable battery operated cigarette lighter comprising, a hollow housing including a housing member forming a side wall, end walls and edge walls of the housing and a cover member secured to the housing member and forming another side wall of the housing, said hollow housing having a battery receiving compartment and a heater element and switch receiving compartment, rechargeable batteries in the first-mentioned compartment, one of the side walls of the housing having an access opening for a cigarette communicating with the second-mentioned compartment, the other of the side walls of the housing having an air supply opening in alignment with the access opening and communicating with the second-mentioned compartment, a heater element in the second-mentioned compartment adjacent the access opening and operative upon energization thereof to ignite a cigarette received in the access opening, a switch in the second-mentioned compartment, electrical connections between the batteries, heater element and switch for energizing the heater element when the switch is closed, one of the edge walls of the housing having an opening communicating with the second-mentioned compartment, and a switch operating member extending through said last-mentioned opening and manipulatable to close the switch, a flag movably mounted in the second-mentioned compartment adjacent the access opening and movable between an advanced position for closing the access opening and a retracted position for opening the access opening, means for connecting the flag to the switch operating member for retracting the flag when the switch is closed by the switch operating member, rectifier means in the housing electrically connected to the batteries for recharging the batteries when energized, and a pair of prongs electrically connected to the rectifier means for reception in an electrical receptacle for energizing the rectifier means.

14. A rechargeable battery operated cigarette lighter comprising, a hollow housing including a housing member forming a side wall, end walls and edge walls of the housing and a cover member secured to the housing member and forming another side wall of the housing, said hollow housing member having a battery receiving compartment, a heater element and switch receiving compartment and a rectifier means receiving compartment, rechargeable batteries in the first-mentioned compartment, a heater element in the second-mentioned compartment operative upon energization thereof to ignite a cigarette, a manipulatable switch in the second-mentioned compartment, electrical connections between the batteries, heater element and switch for energizing the heater element when the switch is closed, rectifier means in the third-mentioned compartment electrically connected to the batteries for recharging the batteries when energized, a pair of prongs electrically connected in said third-mentioned compartment to the rectifier means for energizing the rectifier means, the side walls of said housing adjacent the second and third-mentioned compartments having guideways longitudinally slidably receiving the prongs and slots along the guideways, the end wall of the housing adjacent the third-mentioned compartment having openings through which the prongs are extendable, and manipulatable projections on the prongs extending through said slots for longitudinally sliding the prongs through said last-mentioned openings between hidden retracted positions and operative extended positions for reception in an electrical socket for energizing the rectifier means.

15. A rechargeable battery operated cigarette lighter comprising, a hollow housing including a housing member forming a side wall, end walls and edge walls of the housing and a cover member secured to the housing member and forming another side wall of the housing, said hollow housing member having a battery receiving compartment, a heater element and switch receiving compartment and a rectifier means receiving compartment, rechargeable batteries in the first-mentioned compartment, one of the side walls of the housing having an access opening for a cigarette communicating with the second-mentioned compartment, a heater element in the second-mentioned compartment adjacent the access opening and operative upon energization thereof to ignite a cigarette received in the access opening, a switch in the second-mentioned compartment, electrical connections between the batteries, heater element and switch for energizing the heater element when the switch is closed, one of the edge walls of the housing having an opening communicating with the second-mentioned compartment, and a switch operating member extending through said last-mentioned opening and manipulatable to close the switch, rectifier means in the third-mentioned compartment electrically connected to the batteries for recharging the batteries when energized, a pair of prongs electrically connected in said third-mentioned compartment to the rectifier means for energizing the rectifier means, the side walls of said housing adjacent the second and third-mentioned compartments having guideways longitudinally slidably receiving the prongs and slots along the guideways, the end wall of the housing adjacent the third-mentioned compartment having openings through which the prongs are extendable, and manipulatable projections on the prongs extending through said slots for longitudinally sliding the prongs through said last-mentioned openings between hidden retracted positions and operative extended positions for reception in an electrical socket for energizing the rectifier means.

16. A rechargeable battery operated cigarette lighter comprising, a hollow housing including a housing member forming a side wall, end walls and edge walls of the housing and a cover member secured to the housing member and forming another side wall of the housing, said hollow housing member having a battery receiving compartment, a heater element and switch receiving compartment and a rectifier means receiving compartment, rechargeable batteries in the first-mentioned compartment, one of the side walls of the housing having an access opening for a cigarette communicating with the second-mentioned compartment, the other of the side walls of the housing having an air supply opening in alignment with the access opening and communicating with the second-mentioned compartment, a heater element in the second-mentioned compartment between the access opening and the air supply opening and operative upon energization thereof to ignite a cigarette received in the access opening with combustion supporting air being supplied through the aligned air supply opening, a switch in the second-mentioned compartment, electrical connections between the batteries, heater element and switch for energizing the heater element when the switch is closed, one of the edge walls of the housing having an opening communicating with the second-mentioned compartment, and a switch operating member extending through said last-mentioned opening and manipulatable to close the switch, rectifier means in the third-mentioned compartment electrically connected to the batteries for recharging the batteries when energized, a pair of prongs electrically connected in said third-mentioned compartment to the rectifier means for energizing the rectifier means, the side walls of said housing adjacent the second and third-mentioned compartments having guideways longitudinally slidably receiving the prongs and slots along the guideways, the end wall of the housing adjacent the third-mentioned compartment having openings through which the prongs are extendable, and manipulatable projections on the prongs extending through said slots for longitudinally sliding the prongs through said last-mentioned openings between hidden retracted positions and operative extended positions for reception in an electrical socket for energizing the rectifier means.

References Cited by the Examiner
UNITED STATES PATENTS

| | | | |
|---|---|---|---|
| 2,535,665 | 12/1950 | Boyarsky et al. | 219—268 |
| 2,876,410 | 3/1959 | Fry | 320—2 X |
| 3,007,027 | 3/1961 | Hall | 219—268 |
| 3,013,198 | 12/1961 | Witte et al. | 320—2 |
| 3,028,536 | 4/1962 | Bilsky | 320—2 |
| 3,098,923 | 7/1963 | Behrendt | 219—268 X |

ANTHONY BARTIS, *Acting Primary Examiner.*

V. Y. MAYEWSKY, *Assistant Examiner.*